W. S. SNYDER & J. B. KEESEY.
WORK HOLDER.
APPLICATION FILED MAY 1, 1916.
1,209,633.                                        Patented Dec. 19, 1916.
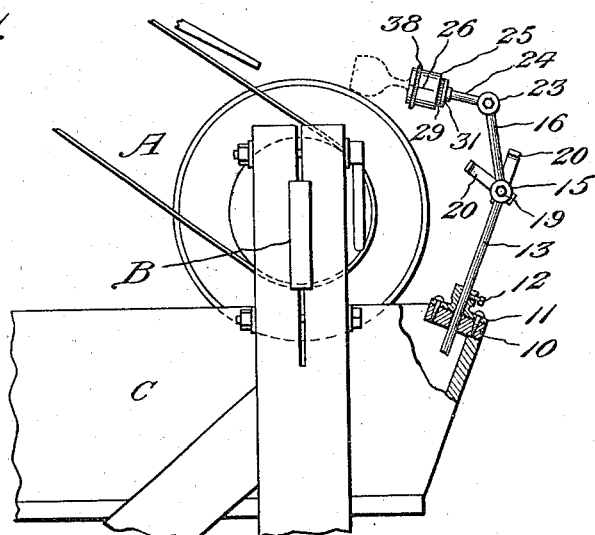
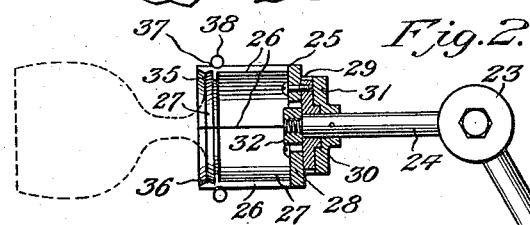
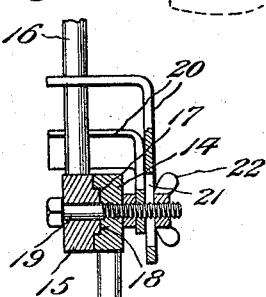
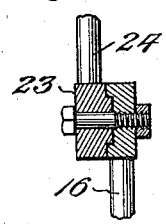
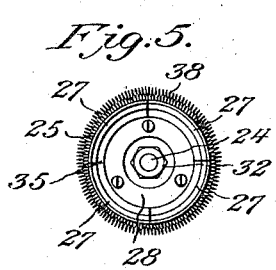
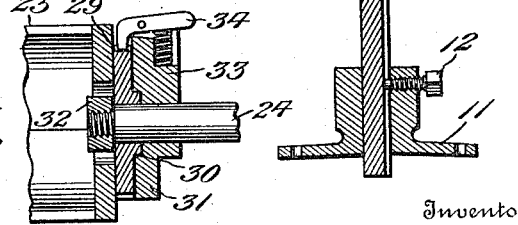
Inventors
Winfield S. Snyder
James B. Keesey
Witnesses
By Victor J. Evans
Attorney

UNITED STATES PATENT OFFICE.

WINFIELD S. SNYDER AND JAMES B. KEESEY, OF COLUMBIA, PENNSYLVANIA.

WORK-HOLDER.

1,209,633.  Specification of Letters Patent.  Patented Dec. 19, 1916.

Application filed May 1, 1916. Serial No. 94,725.

*To all whom it may concern:*

Be it known that we, WINFIELD S. SNYDER, and JAMES B. KEESEY, citizens of the United States, residing at Columbia, in the county of Lancaster and State of Pennsylvania, have invented new and useful Improvements in Work-Holders, of which the following is a specification.

The invention relates to work holders, and more particularly to the class of adjustable holders or brackets for glass ware for use with a glass cutting machine.

The primary object of the invention is the provision of a holder or bracket of this character wherein the articles of glass ware can be firmly clamped therein and held in position relative to the cutting or grinding element for the scoring of the glass article longitudinally thereof or in straight courses, and such scoring will be uniformly spaced apart to give a neat and ornamental individuality of the article of glass ware when finished.

Another object of the invention is the provision of a holder or bracket of this character wherein the construction thereof is novel in form so that the article of glass ware can be automatically fed to the cutter or grinder with accuracy and enabling the scoring of the glass ware for the cutting thereof with despatch so that the glass ware will present uniform scoring throughout the area of its surface worked upon.

A further object of the invention is the provision of a holder or bracket of this character wherein the parts thereof are readily adjustable so that it can be accurately set for the convenient holding of the glass ware to be operated upon for the scoring or cutting thereof to give ornamental effect thereto in the finished article.

A still further object of the invention is the provision of a holder or bracket of this character which is extremely simple in construction, thoroughly efficient in its purpose, strong, durable and inexpensive in manufacture.

Other objects will be in part obvious and in part hereinafter set forth.

The invention accordingly consists in the features of construction, combination of elements and arrangement of parts which will be exemplified in the construction herein-after described, and the scope of the application of which will be indicated in the appended claims.

In the accompanying drawings: Figure 1 is a fragmentary side elevation of a glass ware grinder showing the bracket constructed in accordance with the invention applied and holding in position an article of glass ware; Fig. 2 is an enlarged fragmentary vertical longitudinal sectional view through the holder; Fig. 3 is a vertical transverse sectional view through one of the joints of the holder; Fig. 4 is a sectional view through another of the joints of the holder; Fig. 5 is an end view of the work clamp; Fig. 6 is a fragmentary enlarged vertical longitudinal sectional view through the work clamp showing in detail the ratchet dog and head.

Similar reference characters indicate corresponding parts throughout the several views of the drawings.

Referring to the drawings in detail, A designates a grinder which is of any approved form, and is rotatably supported in a frame B, as usual, the grinder being driven from any suitable source of motive power and is merely shown to illustrate the application and use of the work holder or bracket hereinafter fully described. Arranged within the frame B is the trough C which is of the usual construction, and on one end of which is an inclined board or plate 10 for the mounting of the work holder or bracket hereinafter fully described. The work holder or bracket comprises a base 11 which is fastened to the board or plate 10 in any suitable manner and is formed with a centrally socketed boss 11 having threaded therein a set screw 12 for the fastening in the socketed boss of the upright or post 13 of the work holder or bracket which is adjustably engaged in the said socketed boss, whereby it can be raised or lowered as the occasion may require and the set screw 12 will firmly fasten the post in its adjusted position in the base.

On the upper end of the post 13 is fixed one part 14 of a swiveled joint, the other part 15 of which has fixed therein an arm 16, the part 15 of the joint being formed with a circular hub 17 which fits within a correspondingly shaped socket 18 formed in the part 14, and passed centrally through these parts 14 and 15 is a pivot 19 which rotatably connects the same together. The hub 17 engaged in the socket 18 will prevent any play of the parts 14 and 15, yet permits free rotation of the said parts. Ad-

shaped member and rotatably mounted upon the stem, a latch pawl pivoted upon the head and engageable with the ratchet gear, said cup shaped member being formed with an annular groove in the outer surface of the circular wall adjacent to the internal seat, and a convoluted spring ring disposed concentrically about the cup shaped member and movable into the annular groove for holding the resilient gripping sectors in clamping position.

In testimony whereof we affix our signatures.

WINFIELD S. SNYDER.
JAMES B. KEESEY.

Witnesses:
CLEVELAND W. MORRIS,
ALBERT G. BRADLEY.

Copies of this patent may be obtained for five cents each, by addressing the "Commissioner of Patents, Washington, D. C."